INVENTOR.
JERRY R. YOUNGSTROM
BY Robert G. Clay
ATTORNEY

Jan. 28, 1969 J. R. YOUNGSTROM 3,424,915

PHOTOELECTRIC LOOP LENGTH DETECTOR WITH OPTICAL BIASING MEANS FOR THE PHOTOCELLS

Filed June 7, 1966

INVENTOR.
JERRY R. YOUNGSTROM

BY Robert G. Clay

ATTORNEY

United States Patent Office 3,424,915

Patented Jan. 28, 1969

3,424,915

PHOTOELECTRIC LOOP LENGTH DETECTOR WITH OPTICAL BIASING MEANS FOR THE PHOTOCELLS

Jerry R. Youngstrom, Culver City, Calif., assignor to Ampex Corporation, Redwood City, Calif., a corporation of California Filed June 7, 1966, Ser. No. 555,773

U.S. Cl. 250—219 9 Claims

Int. Cl. G01n 21/30

This invention relates to position detection systems, and more particularly to systems for indicating and controlling the length of tape in a storage member for a magnetic tape transport.

Tape and web transport systems are being required to satisfy increasingly stringent acceleration, deceleration and speed control specifications. In modern digital magnetic tape transports, for example, a high speed tape drive system must predictably accelerate or decelerate a tape to or from full speed, in either direction of motion, generally within a few milliseconds. Because long lengths of tape are needed for handling high data volumes, tape reels are employed for tape supply and takeup. Although servo motors are used to drive the reels, the reels and the drive systems have relatively high masses and inertias. Thus some form of buffer or storage mechanism is used to compensate for the speed and operating rate disparities between the tape drive and the reel drives. Although multiple loop tension arms and various other arrangements are employed for low inertia buffering, the most common expedient for high performance systems is a vacuum chamber of only slightly greater depth than the width of the tape, and having a vacuum or reduced pressure at or adjacent a closed end. This arrangement provides an extremely low inertia and low friction system, and adequate tape storage to free the tape drive system from limitations imposed by the slower operation of the reel drives.

Typically, the loop condition in the chamber is sensed by one or several means, such as devices that sense the velocity of the tape at the end of the chamber, and devices that sense the length of the loop or the presence of the loop at a fixed position. A servo system responsive to the sensing system then controls the reel motor so as to maintain a selected loop length, or to keep the loop between selected limits. Problems of servo design, as well as system response, are greatly simplified and improved if a signal linearly related to instantaneous loop length can be derived.

To this end, prior loop length sensors have often employed arrays of pneumatic or photosensitive elements disposed along the length of the vacuum chamber. These sensors indicate discrete or incremental changes in the length of the loop within the chamber. Photosensitive elements may be disposed in planar or array fashion on one side of a chamber, with a planar light source or array of lights positioned on the opposite side of the loop. It is preferable to employ low cost light responsive devices, such as silicon or selenium cells of the type used for generating power from solar radiation. Such cells, however, are non-linear in their "dark" or lightly excited operating regions. Attempts have been made to bias such cells into linear operating ranges by using resistive networks and by other techniques, but such attempts have still required individual adjustment and have involved excessive circuitry. The desirability of using silicon and other solar cells extends to many other applications in which it is required to sense the position of a movable member. In all such systems the problem of obtaining linearity by a simple but reliable means still exists.

It is, therefore, an object of the present invention to provide an improved loop length detector for a web or tape transport system.

Another object of the present invention is to provide an improved position detector using commercially available solar cells.

A further object of the present invention is to provide an improved detection system for providing an output signal which varies linearly with the length of the tape loop in a magnetic tape transport system, and which is low in cost and reliable in operation.

These and other objects are achieved by a system in accordance with the invention that disposes an array of photosensitive cells longitudinally along the length of a vacuum chamber, and facing away from ambient light sources. One side wall of the vacuum chamber comprises a transparent light guiding element partially covering a transverse part of each cell in the longitudinal array, and providing optical coupling from the light sources to the cells. A planar light source or any array of individual light sources is disposed in an adjacent wall of the chamber from the photocells, such as to be blocked from the cells by an intervening loop, without blocking the light transmitted along the light guiding elment.

With this arrangement, low cost power cells of standard types may be used as the photosensitive elements, because they are constantly energized through the confined light path to a level well above the non-linear region. An array of individual light sources may be utilized because the light is diffused through the light guiding element. The net result is a linear variation, with loop length, in the output current from the array of photosensitive elements, without requiring individual adjustments for cell variations or the use of sepaarte biasing circuits.

A better understanding of the invention may be had by reference to the following description, taken in conjunction with the accompanying drawings, in which:

FIG. 1 shows, in idealized and simplified form, the principal elements of a digital magnetic tape transport.

Figure 1:
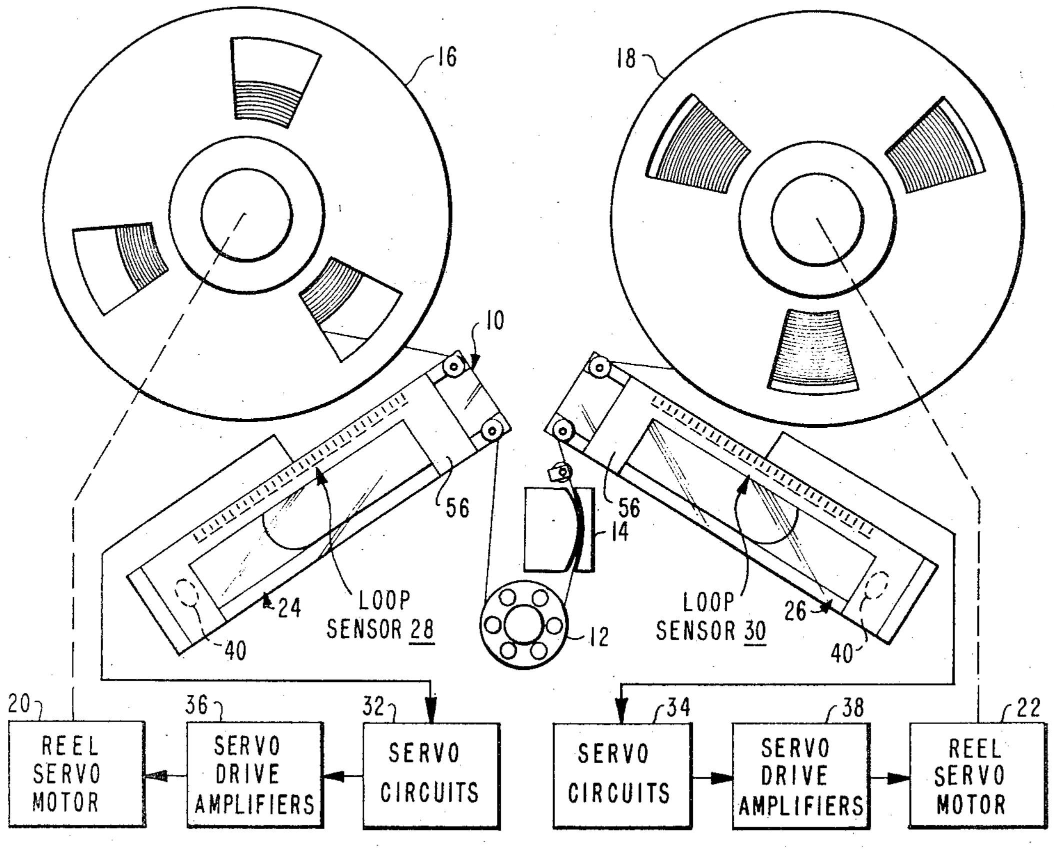
FIG. 1 is a combined plan and block diagram representation in simplified form of the principal elements of a tape transport system, including loop length detectors in accordance with the invention.

In the arrangement of FIG. 1, the high speed reversible tape drive is provided by turning the magnetic tape 10 with a high wrap angle about a single capstan 12, and driving the capstan 12 directly from a high torque to inertia ratio motor (not shown) that is servo controlled. The tape 10 is fed in either direction past a magnetic head assembly 14 between a pair of reels 16, 18, each of which is driven by a different reel servo motor 20, 22. Between each reel 16, 18 and the single drive capstan 12, the tape 10 passes through and is formed into a loop within a different one of a pair of vacuum chambers 24, 26. A loop sensing arrangement 28, 30 (shown in detail below) associated with each chamber 24, 26 generates a signal fed to servo circuits 32, 35 controlling servo amplifiers 36, 38 that energize the reel servo motor 20, 22 to adjust loop length in a predetermined fashion.

The disposition of a loop sensing arrangement in accordance with the invention is shown in greater detail in FIGS. 2–5. Inasmuch as the chambers and sensors are alike, only one arrangement need be described in detail. As is now conventional, it is intended to maintain the tape loop between selected limits or at a selected position within the vacuum chamber 24. The chamber 24 has an open end for receiving the tape 10 and a closed end, with an outlet 40 near the closed end being coupled to lower pressure than exists at the open end. The depth of the vacuum chamber 24, corresponding to the width of the magnetic tape 10, is defined by interior front and back walls 42, 44 respectively, and an interior side wall 46, and is only slightly greater than the magnetic tape 10 transverse dimension. Thus a pressure differential across the tape 10, such as is created by coupling the outlet to a vacuum system (not shown) while the opposite end is coupled to atmospheric pressure maintains the loop extended in the chamber 24. The tape 10 also lies flush against the sides of the chamber 24 except at the rounded bottom portion of the loop. The second interior side wall of the chamber 24 comprises a transparent or translucent light guiding member 50, such as a plastic bar of rectangular cross-section. The light guiding member 50 may consist of any of a number of materials, but it is preferred to use an allyl diglycol carbonate such as "CR–39" sold by the Pittsburgh Plate Company. This material not only serves as a light guide but is highly abrasion resistant, and is preferably used for the front wall 42 as well. A suitable thickness dimension for this plastic bar is approximately ¼ inch, but this is variable in accordance with design. The broad faces of the bar are smooth, and thus transparent, while the edge 52 abutting the front wall represents the cut or machined edge. This edge is finished to a flat surface so that it diffuses light and appears as a relatively uniform light source.

Figure 5:
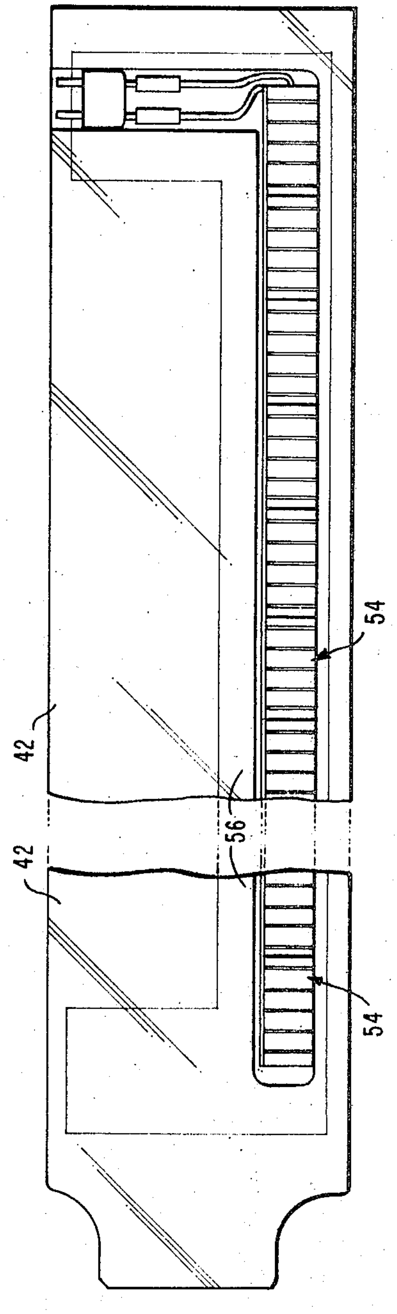
FIG. 5 is a plan view of the arrangement of the solar cell array shown in FIGS. 1 and 2.

A longitudinal array 54 of photosensitive devices (best seen in FIGS. 2, 3 and 5), coupled in parallel, is defined by a series of small rectangular silicon solar cell elements disposed along the front wall 42. The array is mounted along the edge of the vacuum chamber 24 and overlapping the abutting edge 52 of the light guiding member 50. The array 54 of silicon solar cells is here imbedded in the outer side of the front wall 42 facing toward the inward side of the chamber. A planar member 56 is disposed on the outer surface of the front wall 42, to provide a support substrate for the array 54 and shielding from ambient light, without fully closing off the interior of the chamber 24. As best seen in FIG. 5, the array 54 is made up of a series of individual cell groupings coupled together in parallel by longitudinal conductors connected to two terminals. One conductor is an edge bead, while the other is a Kovar strip on the underside (as seen in FIG. 5) of the cells.

Figure 2:
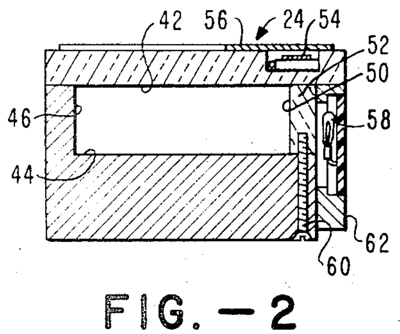
FIG. 2 is a cross-sectional view of a portion of one vacuum chamber of FIG. 1.
Figure 3:
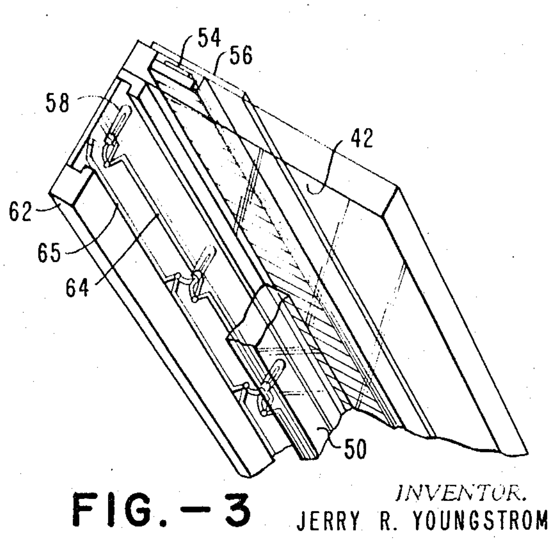
FIG. 3 is an enlarged fragmentary perspective view of a portion of the arrangement of FIG. 2, showing further details thereof.
Figure 4:
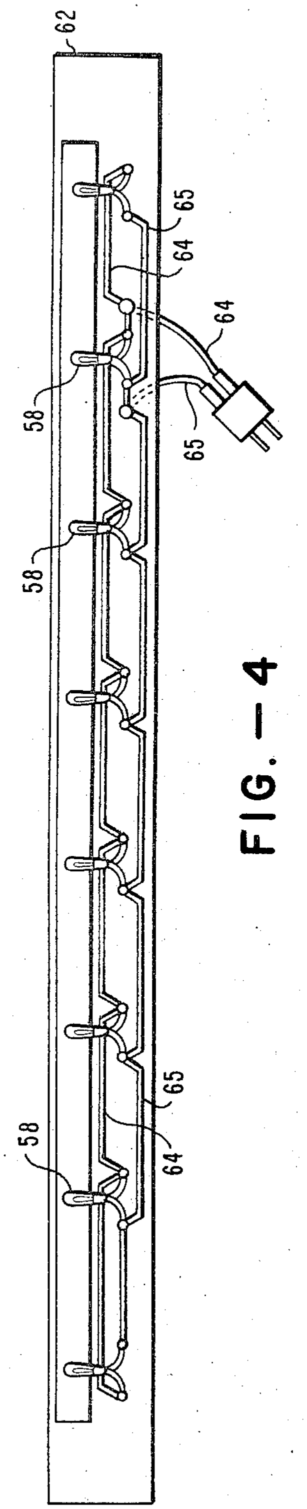
FIG. 4 is a sectional view of a portion of the arrangement of FIGS. 1 and 2, showing the light source arrangement.

The extent of overlap of the individual cells against abutting edge 52 of the light guiding element 50 is approximately 50% in the present example. The overlap is selected so as to maintain the individual cells forward biased without driving the cells substantially toward saturation. If the abutting edge 52 does not provide a light diffusion effect, for example, the overlap would be made substantially less. It is preferred to use a minimum overlap, so as to retain maximum sensitivity in the circuit. Along the side wall of the vacuum chamber 24, adjacent the light guiding element 50 and cross-corner from the solar cell array, are mounted a series of spaced light sources, such as incandescent bulbs 58. An array in a different disposition, or a linear element such as a fluorescent light, may alternatively be employed. For low cost and ease of construction, the light guiding element 50 may have a simple rectangular cross section, and be held in place by removable screws 60 (FIG. 2). The bulbs 58 may be mounted within an aperture in an outer side wall 62, and energized in parallel from a power source (not shown) through printed circuit conductors 64, 65 disposed on one of the surfaces defining the aperture.

The light directed from the bulbs through the side face of the light guiding element 50 onto the array 54 is not intercepted except by the tape 10 loop. The light passing through the edge abutting surface 52 is not intercepted, but is diffused by that surface. Consequently, each cell in the array is constantly illuminated to a fixed minimum extent.

It may be seen that the photocell array 54 faces away from, and is substantially unaffected by ambient light variations. The shielding member 56 on the outer surface of the transparent front wall 42 of the vacuum chamber 24 further reduces ambient light effects, but the tape loop is nonetheless visible to an operator. The cross-corner disposition of the light sources 58 relative to the photosensitive elements in the array 54 provides a close light coupling, and also simplifies the construction because all elements are placed on one side of the unit. Replacement and maintenance are extremely simple because (the front wall 42 being removable) the light guiding element 50 may be taken out simply by removing the screws 60, exposing the lights 58 for replacement or repair.

Significant advantages in linearity and sensitivity are achieved by the overlapping arrangement of the light guiding element 50 relative to the array 54 of photocells. When a light sensitive device, such as a silicon solar cell, selenium cell or other element is utilized in its "dark" region, in which little light energy impinges on the cell, it is highly non-linear. The leakage current of the cell opposes the forward bias current generated by light excitation and becomes a substantial factor as excitation decreases. Furthermore, the leakage currents of different cells vary widely. The constant excitation derived from the light sources 58 through the light guiding element 50, however, effectively keeps each cell forward biased. Each cell is thus driven into its linear region, and the leakage current is reduced to an insignificant level relative to the background.

As a tape loop advances down the chamber 24, therefore, the cross-corner light path from the sources 58 to the photocell array 54 is progressively blocked. The current output from the array 54 decreases linearly from an upper limit to a lower limit which corresponds to the maximum permissible length of the loop in the chamber 24. As shown in FIG. 1, this signal is utilized as an error signal for the reel servo circuit 32. When differentiated in the servo circuits, the signal is representative of the rate of change of loop length. As desired, such signals can be utilized in typical servo fashion to provide lead-lag anticipation and to control maintenance of any one or more selected loop lengths within the chamber 24.

Increasing use of variable length buffer mechanisms is being made in magnetic tape instrumentation recorders, and paper tape recorders, and in a variety of other systems. Related applications exist in other systems in which a variable position member is controlled in servo fashion. Thus, although it will be appreciated that the invention is a particular utility in a digital magnetic tape transport, it also is useful in a variety of other applications in which a signal linearly related to the position of a member is to be provided.

Substantial cost advantages derive from the fact that commercially available silicon power cells can be used in standard sizes. However, the type of photosensitive element can be varied widely. Similarly, although the cross-corner disposition is compact and efficient, an optical coupling can also be used with other configurations. Although reference has principally been made to vacuum chamber systems, the loop sensor would require no modification for use in a pressure chamber system.

While there have been described above and illustrated in the drawings a preferred form of arrangement of a loop length sensor and signal generating system in accordance with the invention, it will be appreciated that the invention is not limited thereto but includes all modifications and variations falling within the scope of the appended claims.

What is claimed is:

1. A loop length sensing system for a loop forming chamber in a web transport system comprising the combination of:

an array of light sensitive elements disposed along one wall of the chamber;

light source means disposed along a second wall of the chamber and positioned to provide a light path to said light sensitive means that is intercepted to a variable length by the loop within the chamber; and optical coupling means disposed along said light source means and along the photosensitive elements and overlapping a portion thereof, to provide constant excitation of said array from said light source means independent of the position of the loop in the chamber.

2. The invention as set forth in claim 1 above, wherein said array comprises parallel-connected silicon solar cells.

3. The invention as set forth in claim 1 above, wherein said photosensitive elements are disposed in a longitudinal array along one side of one wall of the chamber, wherein said light source is disposed longitudinally along an adjacent wall of the chamber, and wherein said light guiding means comprises a transparent element defining said adjacent wall of the chamber.

4. A loop sensing system for loop chambers in digital magnetic tape transports comprising:

means providing interior front and back walls, and a first interior side wall for said chamber;

a second interior side wall element positioned relative to said front, back and first side walls to define the interior cross section of the chamber, said second interior side wall element being of transparent plastic material having light guiding properties, and having an edge abutting said front wall;

a plurality of lights disposed linearly along said second side wall element;

and a plurality of parallel-connected, series-disposed photosensitive planar elements disposed along said front wall adjacent and parallel to said lights and partially overlapping the abutting edge of said second side wall.

5. A tape loop sensing system for differential pressure chambers of the type having a rectangular cross section and an open and closed end and comprising:

means providing interior front and back walls, and a first interior side wall for said chamber, said front wall being of transparent material;

a second interior side wall element consisting of transparent plastic positioned relative to said front, back and first side walls to define therewith the interior cross section of the chamber, said second side wall element having a rectangular cross section and a light-diffusing edge abutting said front wall;

a plurality of parallel-connected longitudinally disposed rectangular silicon solar cells disposed along the outer side of said front wall adjacent the side of said second interior side wall, and overlapping said abutting edge of said second side wall over approximately one-half the area of said cells;

an outer support member disposed along said second side wall and having a longitudinal recess therealong facing said second side wall;

a plurality of incandescent bulbs disposed along said outer support member within said recess and cross-corner from and parallel to said solar cells;

and means including printed circuit conductor means disposed along a surface of said outer support element defining said recess for energizing said bulbs, to provide illumination of said solar cells through a cross-corner light path intercepted by the tape loop to a variable length, and constant illumination through a separate path through said light-diffusing edge surface of said second side wall element, whereby a current is generated by said power cells that varies linearly with the length of the loop in the chamber.

6. The invention as set forth in claim 5 above, wherein said front wall and second side wall are allyl diglycol carbonate, wherein said silicon solar cells face inwardly toward said chamber, and wherein in addition a light shielding member is disposed on the outer side of said solar cells on said front wall.

7. A loop length sensor for use in a vacuum chamber of a digital magnetic tape transport comprising:

an array of light sensitive cells disposed lengthwise along one front corner of the vacuum chamber facing inwardly toward the interior of the vacuum chamber;

a plurality of light sources disposed at the side of the vacuum chamber adjacent the photocell array; and a transparent light guiding sidewall mounted in facing relation to the light sources and positioned against the magnetic tape loop, the edge of the sidewall adjacent the photocell array transversely overlapping a portion of each of the cells to provide forward biasing of each cell with light derived from the light sources, to an extent to maintain each cell excited in a substantially linear portion of its operating range.

8. A system for generating a signal linearly representative of the position of a movable member comprising:

an array of light sensitive cells disposed along the path of movement of the member;

light source means disposed to illuminate said light sensitive cells via a path intercepted to a variable length by said member; and means disposed between said light source means and light sensitive cells for constantly illuminating a portion of said cells.

9. The invention as set forth in claim 8 above, wherein said cells are solar cells constantly illuminated to a level sufficient to be in a forward-biased state.

References Cited

UNITED STATES PATENTS

| | | | |
|---|---|---|---|
| 2,907,565 | 10/1959 | Sauter | 250—219 |
| 3,195,398 | 7/1965 | Shaw | 250—207 X |
| 3,197,645 | 7/1965 | Sperry | 250—219 |
| 3,236,429 | 2/1966 | Klein | 226—45 X |
| 3,240,411 | 3/1966 | Zarleng | 226—45 X |
| 3,250,480 | 5/1966 | Jacoby | 242—55.12 |
| 3,354,318 | 11/1967 | Wahlstrom | 250—219 |

FOREIGN PATENTS

| | | |
|---|---|---|
| 956,636 | 4/1964 | Great Britain. |

RALPH G. NILSON, *Primary Examiner.*

M. A. LEAVITT, *Assistant Examiner.*

U.S. Cl. X.R.

250—212, 227; 226—45; 242—55.12